United States Patent
Gong et al.

(10) Patent No.: US 11,841,589 B2
(45) Date of Patent: Dec. 12, 2023

(54) ARRAY SUBSTRATE, DISPLAY PANEL AND DISPLAY DEVICE

(71) Applicant: HKC CORPORATION LIMITED, Shenzhen (CN)

(72) Inventors: Yongkao Gong, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/947,766

(22) Filed: Sep. 19, 2022

(65) Prior Publication Data
US 2023/0103252 A1    Mar. 30, 2023

(30) Foreign Application Priority Data

Sep. 24, 2021 (CN) .......................... 202111126101.X

(51) Int. Cl.
*G02F 1/1339* (2006.01)
(52) U.S. Cl.
CPC ........ *G02F 1/1339* (2013.01); *G02F 2202/28* (2013.01)
(58) Field of Classification Search
None
See application file for complete search history.

(56) References Cited

U.S. PATENT DOCUMENTS

2013/0141683 A1    6/2013    Chen

FOREIGN PATENT DOCUMENTS

| CN | 1794048 | A | | 6/2006 |
|---|---|---|---|---|
| CN | 101743511 | A | | 6/2010 |
| CN | 103984145 | | * | 8/2014 |
| CN | 106773340 | A | | 5/2017 |
| CN | 109407414 | | * | 3/2019 |
| CN | 109949711 | | * | 6/2019 |
| CN | 110147018 | A | | 8/2019 |
| CN | 112582452 | | * | 3/2021 |
| JP | 2007212817 | A | | 8/2007 |
| JP | 2009251003 | A | | 10/2009 |

OTHER PUBLICATIONS

First Office Action issued in counterpart Chinese Patent Application No. 202111126101.X, dated Jun. 10, 2023.

* cited by examiner

*Primary Examiner* — Ashok Patel
(74) *Attorney, Agent, or Firm* — Westbridge IP LLC

(57) ABSTRACT

Disclosed are an array substrate, a display panel and a display device. The array substrate includes a display area and a non-display area, the non-display area is provided around an outside of the display area, the non-display area is provided with a frame adhesive coating area, the frame adhesive coating area has a frame adhesive coating section, the array substrate further includes a metal pad provided within the frame adhesive coating section and electrically connected to a conductive metal ball, and the metal pad has a shape adapted to a shape of the frame adhesive coating section and extends in an extension direction of the frame adhesive coating section. The array substrate of the technical solution in the present application can ensure good conductivity and reduce the risk of circuit failure.

15 Claims, 3 Drawing Sheets

ARRAY SUBSTRATE, DISPLAY PANEL AND DISPLAY DEVICE

CROSS-REFERENCE TO RELATED APPLICATIONS

The present application claims priority to Chinese Patent Application No. 202111126101.X, titled "Array Substrate, Display Panel And Display Device" and filed on Sep. 24, 2021, which is hereby incorporated for reference in its entirety for all purposes.

TECHNICAL FIELD

The present application relates to the field of display technology, and in particular to an array substrate, a display panel applied with an array substrate and a display device applied with a display panel.

BACKGROUND

Usually, during producing a display panel, it is necessary to set conductive metal balls between the array substrate and the color film substrate to conduct the array substrate and the color film substrate. In the related art, when setting the conductive metal ball, conductive metal balls are doped into the frame adhesive material, a whole layer of frame adhesive with conductivity conducts the array substrate and color film substrate. In this way, when the conductive metal ball is doped inside the frame adhesive, the conductive metal ball is generally electrically connected to the array substrate through the metal pad (AU PAD) However, because there is usually polyimide (PI) liquid (i.e., matching directional liquid) under the frame adhesive, the matching directional liquid will easily affect the conductivity between the metal pad and the array substrate, leading to circuit failure.

SUMMARY

The main purpose of the present application is to provide an array substrate, in the area of the frame adhesive coating section, a metal pad is electrically connected to the conductive metal ball, and the metal pad has a shape adapted to a shape of the frame adhesive coating section, the metal pad extends in an extension direction of the frame adhesive coating section, so that the metal pad can occupy a larger area of the frame adhesive coating section, the conductive area of the metal pad is larger, even when there is a matching directional liquid, good conductivity can be ensured, a risk of circuit failure is reduced.

In order to achieve the above purpose, the present application provides an array substrate, including a display area and a non-display area, the non-display area being provided around an outside of the display area, the non-display area being provided with a frame adhesive coating area, wherein the frame adhesive coating area has a frame adhesive coating section, the array substrate further includes a metal pad provided within the frame adhesive coating section and electrically connected to a conductive metal ball, and the metal pad has a shape adapted to a shape of the frame adhesive coating section and extends in an extension direction of the frame adhesive coating section.

In one embodiment of the present application, the frame adhesive coating area has four frame adhesive coating sections, the four frame adhesive coating sections are a first coating section, a second coating section, a third coating section and a fourth coating section, wherein the first coating section, the second coating section, the third coating section and the fourth coating section are connected sequentially, the first coating section is opposite to the third coating section, the second coating section is opposite to the fourth coating section.

In one embodiment of the present application, the metal pad is provided within the second coating section and the fourth coating section.

In one embodiment of the present application, the metal pad is provided within the second coating section, the third coating section and the fourth coating section.

In one embodiment of the present application, the metal pad includes a first side edge and a second side edge, the first side edge faces the display area and the second side edge faces away from the display area, the metal pad has a diffusion hole for a flow of polyimide (PI) liquid, the diffusion hole passes through the first side edge and the second side edge.

In one embodiment of the present application, the diffusion hole has an aperture diameter D, wherein D is not less than 80 um and not more than 100 um.

In one embodiment of the present application, the metal pad includes a metal layer, a passivation layer and a conductive layer laminated sequentially, the conductive layer electrically connects to the conductive metal ball, the conductive layer is recessed with a connection hole, the connection hole passes through the conductive layer to contact with the metal layer, and conducts the metal layer and the conductive layer.

In one embodiment of the present application, there are a plurality of the connection holes, a plurality of the connection holes are arranged to form a plurality groups of the connection holes, the plurality groups of the connection holes are spaced along an extension direction of the metal pad, and each group of connection holes includes two rows of connection holes, each row of connection holes is formed by connection holes of the first side to connection holes of the second side, and the diffusion holes are provided between two adjacent groups of connection holes.

The present application also provides a display panel, including a color film substrate and an array substrate as mentioned above, the color film substrate is opposite to the array substrate.

The present application also provides a display device, including a backlight module and a display panel as mentioned above, wherein the display panel is opposite to the backlight module.

In the array substrate of the technical solution of the present application, the frame adhesive coating area is provided in the non-display area of the array substrate and the metal pad is provided in the frame adhesive coating section of the frame adhesive coating area, the metal pad can be electrically connected to the conductive metal ball, a circuit between the conductive metal ball and the array substrate can be conducted. A shape of the metal pad is adapted to the shape of the frame adhesive coating section, and an extension direction of the metal pad is the same as that of the frame adhesive coating section. So that when the metal pad is provided in the frame adhesive coating section, it can occupy more area in the frame adhesive coating section. The larger the area of the metal pad is, and the larger the conductive area is, so that even when there is a matching directional liquid, a good conductivity between the conductive metal balls and the array substrate can be ensured, the risk of circuit failure is reduced.

BRIEF DESCRIPTION OF THE DRAWINGS

In order to more clearly explain the embodiments of the present application or the technical solutions in the related art, the following will briefly introduce the drawings in the embodiments or the description of the related art. It is obvious that the drawings described below are only some embodiments of the present application. Other drawings can be obtained for those skilled in the art according to the structure shown in these drawings without paying creative labor.

Figure 1:
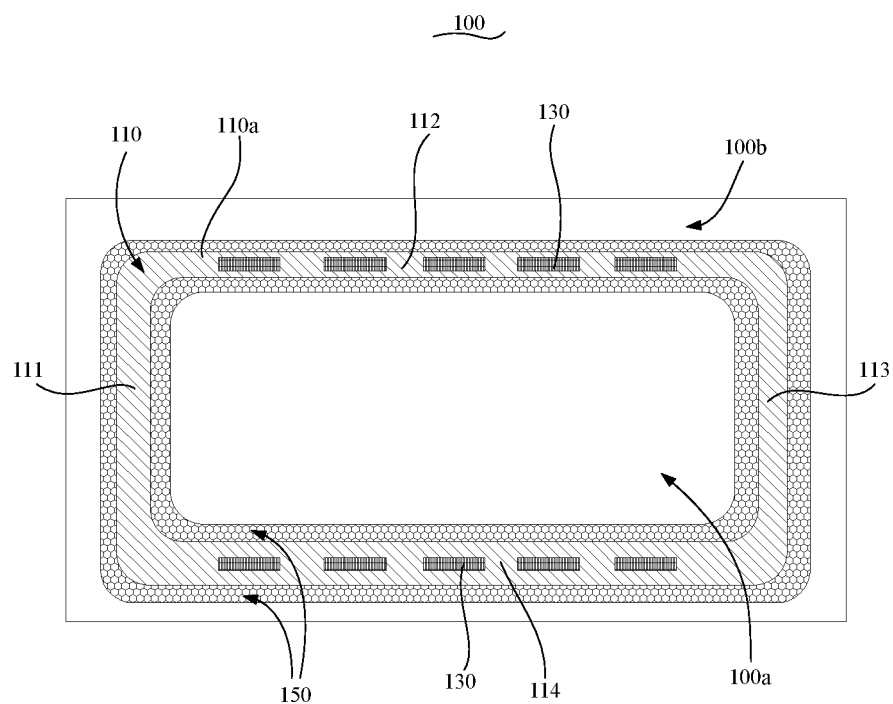
FIG. 1 is a structural view of the array substrate in a first embodiment of the present application.

The realization of the purpose, functional features and advantages of the present application will be further described with reference to the drawings, in conjunction with the embodiments.

DETAILED DESCRIPTION OF THE EMBODIMENTS

The technical solutions in the embodiments of the present application will be clearly and completely described below in conjunction with the drawings in the embodiments of the present application, and it is obvious that the embodiments described are only a part of the embodiments of the present application, and not all of them. Based on the embodiments of the present application, all other embodiments obtained by those skilled in the art without creative labor fall within the claimed scope of the present application.

It should be noted that all directional indications in the embodiments of the present application (such as up, down, left, right, front, back, . . . ) are used only to explain the relative position relationship, movement, etc. among components in a particular posture (as shown in the drawings), and if the particular posture is changed, the matching directional indications change accordingly.

In the present application, unless otherwise specified and limited, the terms "connected" and "fixed" are understood in a broad sense, for example, "fixed" can be a fixed connection, or a removable connection, or integrated, or a mechanical connection, or an electrical connection, or directly connected, or indirectly connected through an intermediate medium, or an internal connection of two components or an interaction relationship of two components, unless otherwise expressly limited. For those skilled in the art, the specific meaning of the above terms in the context of the present application can be understood as need.

In addition, the descriptions in the present application such as "first", "second", etc. are only used for descriptive purposes and are not to be understood as indicating or implying their relative importance or implicitly specifying the number of technical features indicated. Thus, the features defined with "first" and "second" may explicitly or implicitly include at least one such feature. In addition, the meaning of "and/or" appears throughout the text, including three parallel solutions. "A and/or B" is taken as an example, including a solution A, or a solution B, or a solution A and B. In addition, the technical solutions of various embodiments can be combined with each other, but the combination must be achieved by the those skilled in the art. When the combination of technical solutions appears contradictory or cannot be achieved, it should be considered that such a combination of technical solutions does not exist, and is not within the claimed scope of the present application.

Embodiment I

The present application provides an array substrate 100.

Referring to FIG. 1, in this embodiment of the present application, the array substrate 100 includes a display area 100a and a non-display area 100b. The non-display area 100b is provided around an outside of the display area 100a. The non-display area 100b is provided with a frame adhesive coating area 110. The frame adhesive coating area 110 has a frame adhesive coating section 110a. The array substrate 100 includes a metal pad 130, the metal pad 130 is provided within the frame adhesive coating section 110a and electrically connected to a conductive metal ball 300. The metal pad 130 has a shape adapted to a shape of the frame adhesive coating section 110a and extends in an extension direction of the frame adhesive coating section 110a.

The array substrate 100 generally includes a substrate 120, and the metal pad 130 is provided on an upper surface of the substrate 120. The substrate 120 may be a non-conductive transparent glass plate, for example, it may be made of alkali-free glass, to not interfere with the passage of the backlight and to provide a carrier for the base.

The frame adhesive coating area 110 is an area for the coating machine to apply a frame adhesive strip, to coat between the array substrate 100 and the color film substrate 500 to form a sealing frame to seal the liquid crystal molecules. The frame adhesive coating area 110 can consist of one or more frame adhesive coating sections 110a, and the metal pad 130 is provided within the frame adhesive coating section 110a, so that when the frame adhesive is coated in the frame adhesive coating section 110a, the conductive metal balls 300 can be doped in the frame adhesive, so that the conductive metal balls 300 can be electrically conductive with the array substrate 100 and thus electrically conductive with the color film substrate 500 through the frame adhesive.

Figure 2:
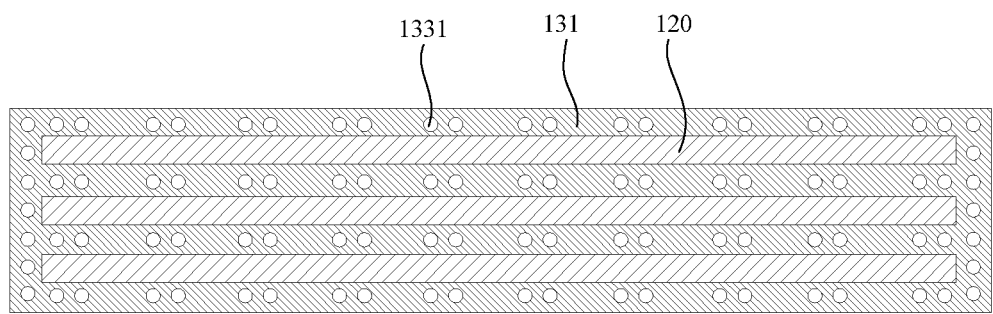
FIG. 2 is a partial top view of the metal pad in the first embodiment of the present application.

In this embodiment, the shape of the metal pad 130 is adapted to that of the frame adhesive coating section 110a, and the extension direction of the metal pad 130 is the same as the extension direction of the frame adhesive coating section 110a. For example, when the frame adhesive coating section 110a is long strip, as shown in FIG. 2, the metal pad 130 is also long strip, and both have the same extension direction, i.e., the length direction. If the frame adhesive coating section 110a is arced shape, the metal pad 130 is also a matching arced shape, or if the frame adhesive coating section 110a is curved shape, the metal pad 130 is a matching curved shape. In such arrangement, the metal pad 130 can occupy a larger area in the frame adhesive coating section 110a, to form a larger conductive area. When the frame adhesive is coated, the conductive metal ball 300 doped in the frame adhesive can better contact with the metal pad 130 to conduct electricity.

Thus, in the array substrate 100 of the technical solution of the present application, the frame adhesive coating area 110 is provided in the non-display area 100b of the array substrate 100 and the metal pad 130 is provided in the frame adhesive coating section 110a of the frame adhesive coating area 110, the metal pad 130 can be electrically connected to the conductive metal ball 300, the conductive metal ball 130 can be conductive with the array substrate 100. The shape of the metal pad 130 is adapted to the shape of the frame adhesive coating section 110a, and an extension direction of the metal pad 130 is the same as that of the frame adhesive coating section 110a. So that when the metal pad 130 is provided in the frame adhesive coating section 110a, it can occupy more area in the frame adhesive coating section 110a. The larger the area of the metal pad 130 is, and the larger the conductive area is, so that even when there is a matching directional liquid, a good conductivity between the conductive metal balls 300 and the array substrate 100 can be ensured, the risk of circuit failure is reduced.

As shown in FIG. 1, there are a plurality of the metal pads 130, and the plurality of the metal pads 130 are spaced along the extension direction of the frame adhesive coating section 110a.

In one embodiment, the number of metal pads 130 may be 2, 3, 4, or even more, the exact number may be adjusted according to the number of frame adhesive coating sections 110a. Of course, a plurality of spaced metal pads 130 can also be provided within each frame adhesive coating section 110a, each metal pad 130 is electrically connected and conductive to each other. It can be understood that such arrangement, an overall area of the metal pads 130 within the frame adhesive coating section 110a is larger, and an area that can contact with the conductive metal balls 300 and conduct electricity will also be larger, thus the risk of circuit failure between the array substrate 100 and the conductive metal balls 300 due to the presence of the matching directional fluid is further reduced.

Referring to FIG. 1 continuously, the frame adhesive coating area 110 has four frame adhesive coating sections 110a, the four frame adhesive coating sections 110a are a first coating section 111, a second coating section 112, a third coating section 113, and a fourth coating section 114. The first coating section 111, the second coating section 112, the third coating section 113, and the fourth coating section 114 are sequentially connected. The first coating section 111 is opposite to the third coating section 113, and the second coating section 112 is opposite to the fourth coating section 114.

In this embodiment, the frame adhesive coating section 110a may be a long stripe, and the frame adhesive coating area 110 consisting of four frame adhesive coating sections 110a has a box shape, so that the liquid crystal can be sealed after the frame adhesive is formed. One or more of the four frame adhesive coating section 110a can be selected to place the metal pad 130, to ensure that the conductive metal ball 300 doped in the frame adhesive can be conductive with the metal pad 130, to ensure the conductivity of the array substrate 100.

In the embodiment of the present application, as shown in FIG. 1, the metal pad 130 is provided within the second coating section 112 and the fourth coating section 114. The metal pad 130 is provided the second coating section 112 and the third coating section 113, which are opposite to each other. When the gate layer is provided in the first coating section 111, the metal pad 130 will not interfere with a gate layer, and a sufficient conductive area of the metal pad 130 can be ensured, to ensure the conductive performance.

Embodiment II

Figure 3:
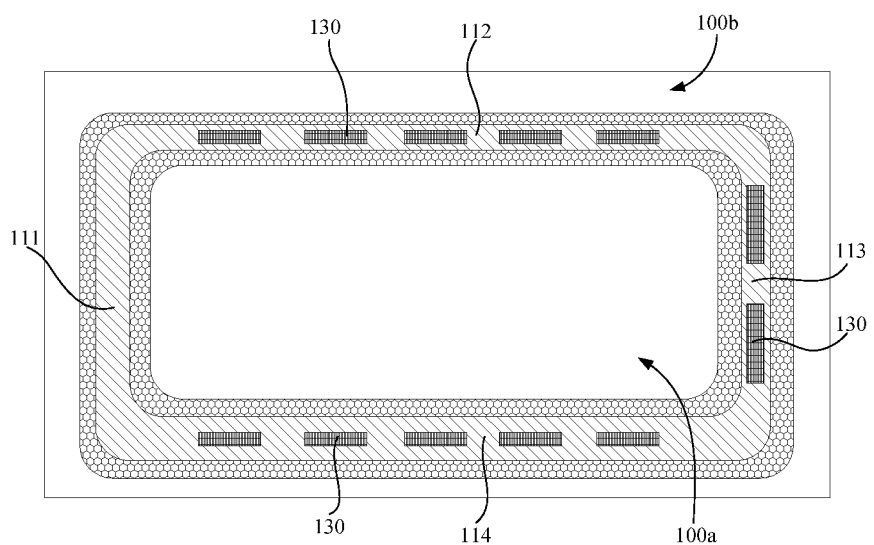
FIG. 3 is a structural view of the array substrate in a second embodiment of the present application.

Referring to FIG. 3, in this embodiment, the same as in the Example I, the frame adhesive coating area 110 has four frame adhesive coating sections 110a. The first coating section 111, the second coating section 112, the third coating section 113 and the fourth coating section 114 are connected sequentially, the first coating section 111 is opposite to the third coating section 113, the second coating section 112 is opposite to the fourth coating section 114, the metal pad 130 is provided within the second coating section 112, the third coating section 113 and the fourth coating section 114.

In this embodiment, since the gate layer is provided at the corresponding position of the first coating section 111, the metal pad 130 is provided in the second coating section 112, the third coating section 113 and the fourth coating section 114. The metal pad 130 and the gate layer can avoid interfering with each other, and the metal pad 130 can occupy more space and area in the frame adhesive coating area 110, to improve electrical conductivity.

As there is usually a matching directional liquid layer 150 on the substrate 120 of the array substrate 100, the PI liquid (matching directional liquid) in the matching directional liquid layer 150 needs to diffuse from a side of the display area 100a to a side of the non-display area 100b through the frame adhesive coating area 110, as shown in FIG. 1. However, considering that when the shape of the metal pad 130 is adapted to the shape of the frame adhesive coating section 110a, for example, when the metal pad 130 is a long strip that fits the shape of the frame adhesive coating section 110a, the long strip of the metal pad 130 of the long strip tends to block the diffusion of the PI liquid outward, and thus tends to have light leakage and poor peripheral strip Mura.

Figure 4:
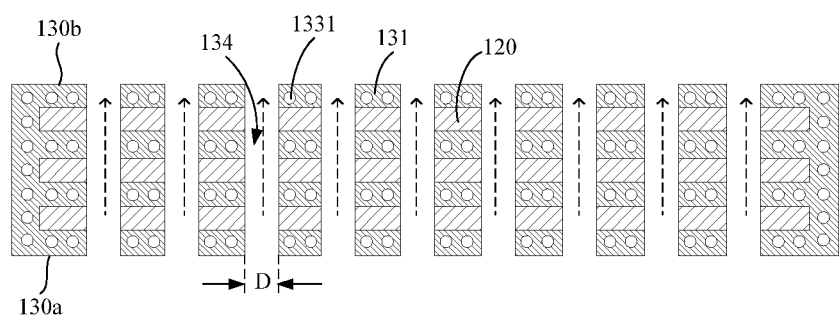
FIG. 4 is a partial top view of the metal pad in the second embodiment of the present application; wherein a direction of the dashed arrow is a direction of diffusion of the matching directional liquid.

Referring to FIG. 4, in order to avoid the metal pad 130 blocking the PI liquid from diffusing outward. In this embodiment, the metal pad 130 includes a first side edge 130a and a second side edge 130b, the first side edge 130a faces the display area 100a, the second side edge 130b faces away from the display area 100a, the metal pad 130 is also provided with a diffusion hole 134 for a flow of the matching directional liquid, the diffusion hole 134 passes through the first side edge 130a and the second side edge 130b.

In one embodiment, the diffusion hole 134 can be a circular opening or a square opening, etc., which passes through the first side edge 130a and the second side edge 130b, so that the PI liquid (matching directional liquid) can be diffused from the first side edge 130a to the second side edge 130b, to effectively avoid the metal pad 130 from the blocking and diffusion of the matching directional liquid, and avoiding light leakage and poor peripheral strip Mura and white spots existing in peripheral strip Mura.

Referring to FIG. 4, the diffusion hole has an aperture diameter D, D is not less than 80 um and not more than 100 um.

The aperture diameter of the diffusion hole 134 cannot be too large or too small. If the aperture diameter of the diffusion hole 134 is too large, it will make the effective area of the metal pad 130 smaller, to affect the conductivity between the ITO conductive line of the array substrate 100 and the metal pad 130. If the aperture diameter of the diffusion hole 134 is too small, the diffusion of conductive liquid by the diffusion hole 134 is not well, the light leakage and white spots will appear. Therefore, in this embodiment, the aperture diameter D of the diffusion hole 134 is not less than 80 um and not more than 100 um.

It should be understood that in practical application, the specific value of the aperture diameter D of the diffusion hole 134 can be 80 um, 85 um, 88 um, 90 um, 95 um or 100 um, etc.

Embodiment III

Figure 5:
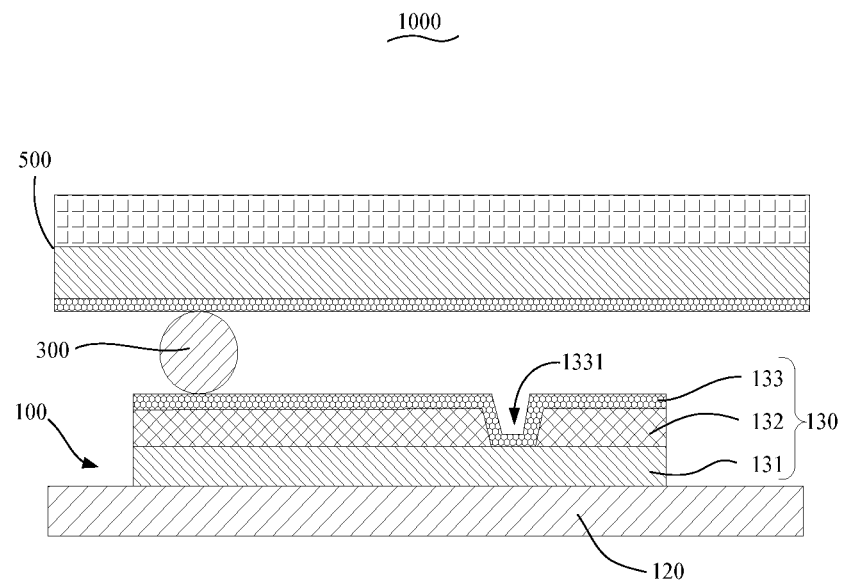
FIG. 5 is a structural view of a display panel in a third embodiment of the present application.

Referring to FIG. 5, the present application also proposes a display panel 1000, which includes a color film substrate 500 and an array substrate 100. The color film substrate 500 and the array substrate 100 are relative to each other, and the specific structure of the array substrate 100 refers to the above embodiment, and since this display panel 1000 adopts all the technical solutions of the above embodiment, it has at least all the beneficial effects brought by the technical solutions of the above embodiments and will not be repeated here.

The display panel 1000 is a component of display device 3000, which can be liquid crystal display panel 1000. Multiple layers of thin-film transistors are laminated to form the array substrate 100 and the array substrate 100 is connected to an integrated circuit (IC) board for controlling the voltage on the IC control circuit, and transferring the voltage to the liquid crystal molecules, to determine the deflection of the liquid crystal molecules. There are liquid crystals sealed between the array substrate 100 and the color film substrate 500. When the array substrate 100 and the color film substrate 500 are conductive with the frame adhesive through the conductive metal ball 300, the liquid crystal molecules can be controlled to change the direction of movement, to refract the light from the backlight to produce the picture.

Referring to FIG. 5, in the display panel 1000 of the present application, the metal pad 130 includes a metal layer 131, a passivation layer 132 and a conductive layer 133 laminated sequentially, the conductive layer 133 electrically connects to the conductive metal ball 300, the conductive layer 133 is recessed with connection holes 1331, the connection holes 1331 passes through the conductive layer 133 to contact with the metal layer 131, and the conductive layer 133 can be conductive with the conductive layer 133.

The metal layer 131 is provided on an upper surface of substrate 120 to conduct electricity, to conduct the circuit of array substrate 100. The passivation layer 132 can serve as insulation and protection, and the conductive layer 133 can conduct with the conductive line of array substrate 100. The connection hole 1331 can be a circular micro-hole, so that the conductive layer 133 and the metal layer 131 can be electrically connected through the connection hole 1331. When the conductive metal ball 300 is electrically connected to the conductive layer 133, the coated frame adhesive, the conductive metal ball 300 located in the frame adhesive can be used to conduct the ITO conductive line of the array substrate 100 and the ITO conductive lines of the color film substrate 500.

As shown in FIG. 4, there are a plurality of the connection holes 1331, the plurality of the connection holes 1331 are arranged to form a plurality groups of the connection holes 1331, a plurality groups of the connection holes 1331 are spaced along the extension direction of the metal pad 130, and each group of connection holes 1331 includes two rows of connection holes 1331, each row of connection holes 1331 is formed by the connection holes 1331 of the first side edge 130a to the connection holes 1331 of the second side edge 130b, and the diffusion holes 134 is provided between the adjacent two groups of connection holes 1331.

In this embodiment, there are plurality of diffusion holes 134, and the plurality of diffusion holes 134 and the plurality groups of the connection holes 1331 are arranged alternately with each other in the extension direction of the metal pad 130. In such arrangement, on the one hand, it can ensure that diffusion holes 134 will not affect the connection holes 1331 to conduct the conductive layer 133 with the metal layer 131; on the other hand, a plurality of diffusion holes 134 can simultaneously diffuse the matching directional fluid on a side of display area 100a, the diffusion and flow of the matching directional fluid can be ensured to avoid light leakage and poor peripheral strip Mura.

Embodiment IV

Figure 6:
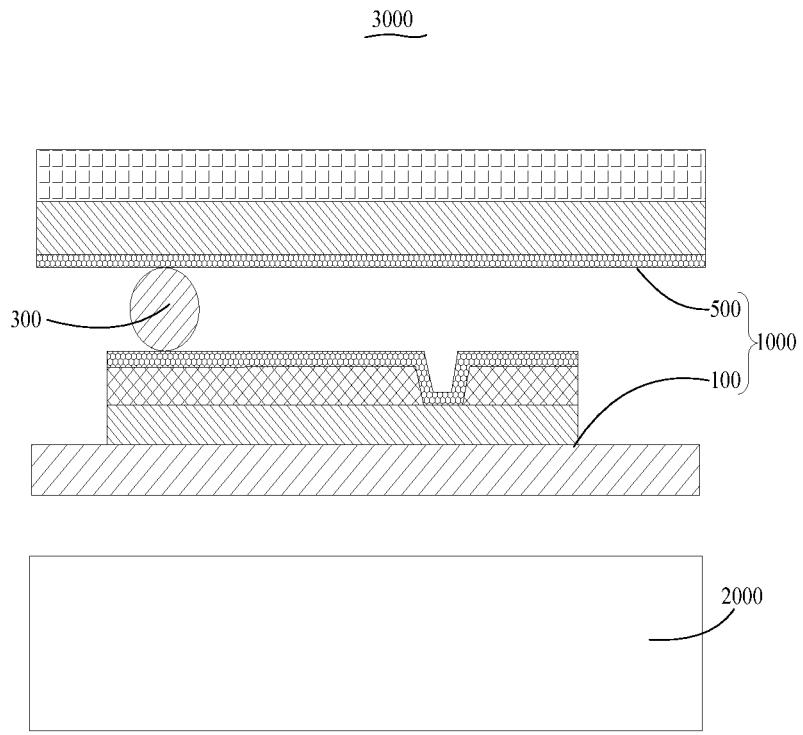
FIG. 6 is a structural view of a display device in a fourth embodiment of the present application.

Referring to FIG. 6, the present application also proposes a display device 3000, which includes a backlight module 2000 and a display panel 1000 opposite to each other, the specific structure of the display panel 1000 refers to the above-mentioned embodiments, and since the display device 3000 adopts all the technical solutions of all the above-mentioned embodiments, it has at least all the beneficial effects brought by the technical solutions of the above embodiments and will not be repeated here.

The display device 3000 can be a liquid crystal display, for example, a monitor display, etc. The backlight module 2000 is mainly used to provide a uniform and bright light source for the display device 3000. The backlight module 2000 generally includes a light source, a light guide sheet, a reflective sheet and an optical film, the reflective sheet can be a reflective coating layer coated on the surface of the light guide sheet. The light guide sheet can convert the light source from a point light source to a uniform surface light source, and the reflective sheet can prevent the light emitting into the light guide sheet from emitting from a side away from the emitting surface and the light is reflected back into the light guide sheet, which can prevent the waste of light energy and effectively improve the utilization of light. The backlight source provided by the above-mentioned backlight module 2000 can make the display device 3000 get a better display effect.

The above mentioned is only a preferred embodiment of the present application, but not to limit the claimed scope of the present application. Any equivalent structural transformation made under the inventive concept of the present application by using the content of the specification of the present application and the drawings, or direct/indirect application in other related technical fields are included in the claimed scope of the present application.

The invention claimed is:

1. An array substrate, comprising a display area and a non-display area, the non-display area being provided around an outside of the display area, the non-display area being provided with a frame adhesive coating area,
   wherein the frame adhesive coating area has a frame adhesive coating section, the array substrate further comprises a metal pad provided within the frame adhesive coating section and electrically connected to a conductive metal ball, the metal pad comprises a metal layer, a passivation layer and a conductive layer laminated sequentially, the conductive layer is electrically connected to the conductive metal ball, and the metal pad has a shape adapted to a shape of the frame adhesive coating section and extends in an extension direction of the frame adhesive coating section, and
   wherein the metal pad comprises a first side edge and a second side edge, the first side edge faces the display area and the second side edge faces away from the display area, the metal pad has a diffusion hole for a flow of polyimide (PI) liquid, the diffusion hole passes through the first side edge and the second side edge.

2. The array substrate according to claim 1, wherein the frame adhesive coating area has four frame adhesive coating sections, the four frame adhesive coating sections are a first coating section, a second coating section, a third coating section and a fourth coating section, wherein the first coating section, the second coating section, the third coating section and the fourth coating section are connected sequentially, the first coating section is opposite to the third coating section, the second coating section is opposite to the fourth coating section.

3. The array substrate according to claim 2, wherein the metal pad is provided within the second coating section and the fourth coating section.

4. The array substrate according to claim 2, wherein the metal pad is provided within the second coating section, the third coating section and the fourth coating section.

5. The array substrate according to claim 1, wherein the diffusion hole has an aperture diameter D, wherein D is not less than 80 um and not more than 100 um.

6. The array substrate according to claim 1, wherein the conductive layer is recessed with a connection hole, the connection hole passes through the conductive layer to contact with the metal layer, and conducts the metal layer and the conductive layer.

7. The array substrate according to claim 6, wherein there are a plurality of the connection holes, the plurality of the connection holes are arranged to form a plurality groups of the connection holes, the plurality groups of the connection holes are spaced along an extension direction of the metal pad, and each group of connection holes comprises two rows of connection holes, each row of connection holes is formed by connection holes of the first side to connection holes of the second side, and the diffusion holes are provided between two adjacent groups of connection holes.

8. A display panel, comprising a color film substrate and an array substrate, the color film substrate being opposite to the array substrate;
wherein the array substrate comprises a display area and a non-display area, the non-display area is provided around an outside of the display area, the non-display area is provided with a frame adhesive coating area;
wherein the frame adhesive coating area has a frame adhesive coating section, the array substrate further comprises a metal pad provided within the frame adhesive coating section and electrically connected to a conductive metal ball, the metal pad comprises a metal layer, a passivation layer and a conductive layer laminated sequentially, the conductive layer is electrically connected to the conductive metal ball, and the metal pad has a shape adapted to a shape of the frame adhesive coating section and extends in an extension direction of the frame adhesive coating section, and
wherein the metal pad comprises a first side edge and a second side edge, the first side edge faces the display area and the second side edge faces away from the display area, the metal pad has a diffusion hole for a flow of polyimide (PI) liquid, the diffusion hole passes through the first side edge and the second side edge.

9. The display panel according to claim 8, wherein the frame adhesive coating area has four frame adhesive coating sections, the four frame adhesive coating sections are a first coating section, a second coating section, a third coating section and a fourth coating section, wherein the first coating section, the second coating section, the third coating section and the fourth coating section are connected sequentially, the first coating section is opposite to the third coating section, the second coating section is opposite to the fourth coating section.

10. The display panel according to claim 9, wherein the metal pad is provided within the second coating section and the fourth coating section.

11. The display panel according to claim 9, wherein the metal pad is provided within the second coating section, the third coating section and the fourth coating section.

12. The display panel according to claim 8, wherein the diffusion hole has an aperture diameter D, wherein D is not less than 80 um and not more than 100 um.

13. The display panel according to claim 12, wherein the conductive layer is recessed with a connection hole, the connection hole passes through the conductive layer to contact with the metal layer, and conducts the metal layer and the conductive layer.

14. The display panel according to claim 13, wherein there are a plurality of the connection holes, the plurality of the connection holes are arranged to form a plurality groups of the connection holes, the plurality groups of the connection holes are spaced along an extension direction of the metal pad, and each group of connection holes comprises two rows of connection holes, each row of connection holes is formed by connection holes of the first side to connection holes of the second side, and the diffusion holes are provided between two adjacent groups of connection holes.

15. A display device, comprising a backlight module and a display panel;
wherein the display panel is opposite to the backlight module, and the display panel comprises a color film substrate and an array substrate, the color film substrate is opposite to the array substrate;
wherein the array substrate comprises a display area and a non-display area, the non-display area is provided around an outside of the display area, the non-display area is provided with a frame adhesive coating area;
wherein the frame adhesive coating area has a frame adhesive coating section, the array substrate further comprises a metal pad provided within the frame adhesive coating section and electrically connected to a conductive metal ball, the metal pad comprises a metal layer, a passivation layer and a conductive layer laminated sequentially, the conductive layer is electrically connected to the conductive metal ball, and the metal pad has a shape adapted to a shape of the frame adhesive coating section and extends in an extension direction of the frame adhesive coating section, and
wherein the metal pad comprises a first side edge and a second side edge, the first side edge faces the display area and the second side edge faces away from the display area, the metal pad has a diffusion hole for a flow of polyimide (PI) liquid, the diffusion hole passes through the first side edge and the second side edge.

* * * * *